United States Patent [19]

Yamada et al.

[11] Patent Number: 4,776,440
[45] Date of Patent: Oct. 11, 1988

[54] SHOCK ABSORBER WITH RESILIENTLY BIASED ADJUSTMENT PISTON

[75] Inventors: Katsumi Yamada, Zama; Toshinari Hojima, Yokohama, both of Japan

[73] Assignees: Nissan Motor Co., Ltd.; Kato Hatsujo Kaisha Ltd., both of Japan

[21] Appl. No.: 804,144

[22] Filed: Dec. 3, 1985

[30] Foreign Application Priority Data

Dec. 3, 1984 [JP] Japan .................. 59-255181
Dec. 3, 1984 [JP] Japan .................. 59-255182

[51] Int. Cl.⁴ .................. F16F 9/48; F16F 9/02; E05F 3/00; F16J 1/00
[52] U.S. Cl. .................. 188/284; 16/66; 92/172; 188/297; 188/301
[58] Field of Search ........ 188/275, 280, 281, 287–297, 188/300, 301, 322.22, 284, 286; 267/120, 124, 64.11; 16/66, 84, DIG. 17; 248/354.1; 296/37.12, 37 B, 57 A; 92/172, 177, 163; 180/300

[56] References Cited

U.S. PATENT DOCUMENTS

| | | | |
|---|---|---|---|
| 334,105 | 1/1886 | Burch et al. ............ | 92/172 X |
| 1,254,106 | 1/1918 | Young .................... | 188/301 |
| 1,744,514 | 1/1930 | Thompson ............. | 188/287 |
| 3,218,849 | 11/1965 | Marvinney et al. ..... | 188/287 X |
| 3,307,842 | 3/1967 | Ellis, Jr. ................. | 267/64.11 X |
| 3,531,065 | 9/1970 | Brown .................... | 188/287 X |

FOREIGN PATENT DOCUMENTS

| | | |
|---|---|---|
| 1834295 | 7/1961 | Fed. Rep. of Germany . |
| 2153285 | 2/1974 | Fed. Rep. of Germany . |
| 2237914 | 2/1974 | Fed. Rep. of Germany . |
| 2757711 | 8/1985 | Fed. Rep. of Germany . |
| 58-174038 | 10/1983 | Japan . |
| 59-27558 | 8/1984 | Japan . |
| 244550 | 12/1925 | United Kingdom ......... 188/287 |

Primary Examiner—Douglas C. Butler
Assistant Examiner—Robert J. Oberleitner
Attorney, Agent, or Firm—Leydig, Voit & Mayer

[57] ABSTRACT

A shock absorber comprises a cylinder with a cylindrical bore, an actuator piston with a rod slidably received in the bore, and an adjustment piston slidably received in the bore and resiliently kept in a predetermined position. The adjustment piston cooperates with the actuator piston to define an adjustment chamber therebetween. The adjustment piston is movable in response to pressure developing within the adjustment chamber to vary a rate of air flow between the adjustment chamber and the ambient atmosphere so as to decelerate the actuator piston during its extending movement relative to the cylinder, thus providing a slow and gradual extending movement of the actuator piston.

6 Claims, 4 Drawing Sheets

SHOCK ABSORBER WITH RESILIENTLY BIASED ADJUSTMENT PISTON

BACKGROUND OF THE INVENTION

The present invention relates to a shock absorber, and more particularly to a shock absorber which may find its application in controlling closing and opening movement of a closure of a box, such as a glove box of an automotive vehicle.

The shock absorber of this kind has been proposed. Japanese Utility Model application laid-open publication No. 59-27558 discloses a shock absorber comprising a cylinder having a cylindrical bore, a peripheral wall defining the cylindrical bore, and an end wall closing one axial end of the bore. An actuator piston has a piston head slidably disposed in the bore and a rod extending out of the cylinder through the opposite open axial end thereof. The piston head cooperates with the end wall to define a chamber. The end wall is formed with a tapped air hole with which an adjustment screw is engaged for providing a fluid flow passage between the chamber and the ambient atmosphere. The piston head has a valve element formed of an elastomer fixedly mounted thereto. The valve element has a tubular base portion fit in a circumferential groove formed around the piston head, and an integral cup-shaped sealing lip portion. The cup-shaped sealing lip portion is compressed radially within the bore, thus keeping an engagement with the peripheral wall to seal a clearence around the piston head. The cup-shaped sealing lip portion is flexed to reduce the engagement with the peripheral wall during movement of the actuator piston relative to the cylinder in a direction to contract the shock absorber even though it comes into firm engagement with the peripheral wall during an opposite movement of the actuator piston in a direction to extend the shock absorber. Thus, although a smooth contracting movement of the actuator piston is always ensured, the extending movement of the actuator piston is effectively resisted to provide a slow movement. If the shock absorber stays in its fully contracted position for a long time, the valve element tends to stick with the peripheral wall, making the movement of the actuator piston difficult, rendering the shock absorber inoperative. To cope with this problem, a plurality of projections are formed on the peripheral wall within an area where the valve element will be situated when the actuator piston is received deeply into the cylinder, so that the valve element rides on the projections and thus is separated from the peripheral wall.

According to this known shock absorber, the rate of air flowing through the air hole remains constant even though it is manually adjustable by turning the adjustment screw, so that although it extends at a desired slow speed if it is pulled out of the cylinder with a small force, the actuator piston no longer extends at such desired slow speed if it is pulled out of the cylinder with a large force. Thus, if it is used as a shock absorber for a glove box of an automotive vehicle, for example, the glove box will be opened at a high speed until it abruptly brought to a halt at its fully open position if a load carried by the glove box is heavy. Since, the rate of air flow through the air hole has to be adjusted to a value large enough to provide smooth contracting movement, it is the valve element which plays a main role in generating a sliding friction during the extending movement thereof.

Therefore, this known shock absorber does not meet a demand that the actuator piston should extend at substantially the same slow speed regardless of the magnitude of a load applied. Besides, since it has a special contour, the valve element is difficult to mount and has a short operating life.

Japanese patent application laid-open publication No. 58-174038 discloses a shock absorber that is designed to be used for a glove box of an automotive vehicle. This known shock absorber comprises a cylinder having a cylindrical bore, a peripheral wall and a closed end wall formed with an air hole, an actuator piston including a piston head slidably disposed is the bore and a rod extending out of the cylinder through an open end of the cylinder. The piston head cooperates with the closed end wall to define a chamber that is allowed to communicate with the ambient atomosphere through the air hole. The peripheral wall is formed with air holes opening into the chamber. A rubber tube wrapping around the peripheral wall to cover the air holes. During extending movement of the actuator piston relative to the cylinder when the associated glove box is being moved from its closed position to fully opened position, a vacuum develops in the chamber and air is allowed to enter the chamber only through the air hole formed through the end wall because the air holes formed through the peripheral wall are closed by the rubber tube. The air flow through the air hole formed through the end wall is restricted by a throttle valve or a ring-shaped one-way type throttle valve formed of a rubber. As a result, the actuator piston extends out of the cylinder at a desired slow speed. During contracting movement of the actuator piston when the glove box is closed, a positive pressure develops in the chamber to push open the air holes formed through the peripheral wall by lifting the rubber tube. Thus, air can escape from the chamber not only through the end air hole, but also through the peripheral end holes.

This, known device suffers from the same problem as the first mentioned known device because the rate of flow of air between the ambient atmosphere and the chamber during extentding movement of the actuator piston is not variable and constant regardless of the magnitude of a load applied.

The present invention aims at improving a shock absorber of the type wherein a speed of movement of an actuator piston is largely dependent on a rate of fluid flow into and out of a chamber defined by a piston head of the actuator piston such that extending movement of the shock absorber is kept at substantially the same slow speed regardless of the magnitude of a load applied.

SUMMARY OF THE INVENTION

According to the present invention, there is provided a shock absorber, comprising:

a cylinder having a bore and a peripheral wall defining said bore an actuator piston including a piston head slidably disposed in said bore and a rod extending out of said cylinder an adjustment piston slidably disposed in said bore and cooperating with said piston head to define an adjustment chamber therebetween means for defining a passage between said adjustment chamber and the ambient atmosphere and means for resiliently keeping said adjustment piston in a predetermined position said adjustment piston being movable within said bore to vary a rate of fluid flow through said passage in response to movement of said adjustment piston.

DESCRIPTION OF THE PREFERRED EMBODIMENTS

Referring to FIGS. 1(a) to 1(f), a first embodiment of a shock absorber according to the present invention is described. The shock absorber 10 comprises a cylinder 12 having a cylindrical bore 14 and a peripheral wall 16 defining the cylindrical bore 14. The cylinder 12 also has an apertured end wall 18, formed with a plurality of air holes 20, closing one end of the bore 14. The opposite end of the bore 14 is an open end 22. The apertured end wall 18 is formed with a mounting ring 24.

Figure 1A:
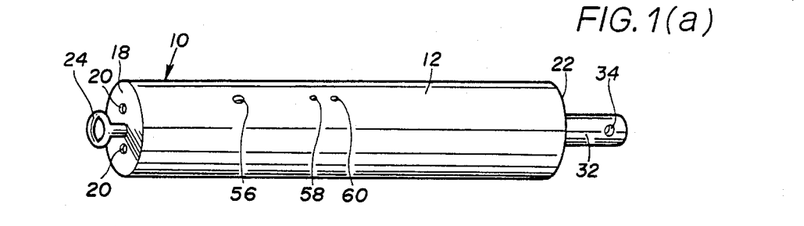
FIG. 1(a) is a perspective plan view showing a first embodiment of a shock absorber according to the present invention
Figure 1B:
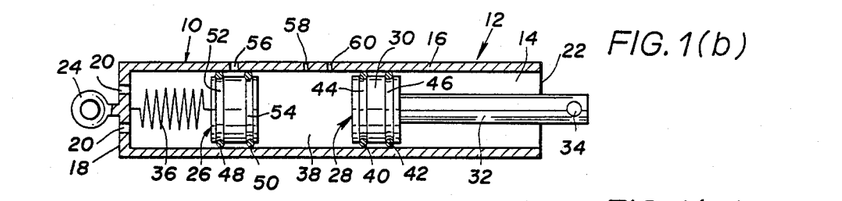
FIG. 1(b) is a sectional view of the shock absorber showing the position of parts in a contracted stable state

An adjustment piston 26 is slidably received in the bore 14 and disposed near the apertured end wall 18. Also received in the bore 14 is an actuator piston 28 having a piston head 30 and a rod 32 having one end fixedly attached to the piston head 30 and an opposite end formed with a mounting aperture 34. The rod 32 extends out of the cylinder 12 via the open end 22.

For resiliently keeping the adjustment piston 26 in a predetermined position as illustrated in FIG. 1(b), a return spring 36 has one end engaging the apertured end wall 18 and an opposite end engaging the adjustment piston 26. The adjustment piston 26 cooperates with the piston head 30 of the actuator piston 28 to define an adjustment chamber 38 therebetween.

Two O-rings 40, 42 are received in mounting grooves 44, 46 of the piston head 30 and maintain slidable engagement with the peripheral wall 16, while two O-rings 48, 50 are received in mounting grooves 52, 54 of the adjustment piston 26 and maintain slidable engagement with the peripheral wall 16.

For defining an air flow passage between the adjustment chamber 38 and the ambient atmosphere so as to allow air flow therebetween, a plurality, three in this embodiment, of adjustment holes 56, 58, 60 are formed through the peripheral wall 16. Among all, the hole 56 has the largest opening area, while the other holes 58, 60 are smaller in opening area. These holes 56, 58, and 60 are arranged in a longitudinal direction of the cylinder 12 from the left to the right as viewed in FIGS. 1(a) to 1(f). Although, three holes are separately formed as arranged in the longitudinal direction of the cylinder 12, in this embodiment, they may be replaced with a single hole elongate in a longitudinal direction of the cylinder 12. As will be readily understood from FIGS. 1(b) to 1(f), the adjustment piston 26 is movable from the position illustrated in FIG. 1(b) to a position illustrated in FIG. 1(d). This rightward movement of the adjustment piston 26 results in preventing the hole 58 from opening to the adjustment chamber 38, causing a reduction in the flow rate of air entering the adjustment chamber 38. The adjustment piston 26 is movable from the position illustrated in FIG. 1(b) to a position illustrated in FIG. 1(f). This leftward movement of the adjustment piston 26 results in allowing the hole 56 to open to the adjustment chamber 38, too, causing an increase in the flow rate of air escaping the adjustment chamber 38. The arrangement is such that when the adjustment piston 26 is kept in the predetermined position as illustrated in FIG. 1(b), the hole 56 is situated between the two O-rings 48, 50, so this hole 56 is prevented from opening to the adjustment chamber 38.

The shock absorber 10 operates as follows: It is now assumed that the mounting ring 24 of the cylinder 12 is pivoted to a housing in which a glove box is swingably mounted, and the rod 32 of the actuator piston 28 is pivotably mounted to the glove box via the aperture 34 formed through the rod 32.

Figure 1C:
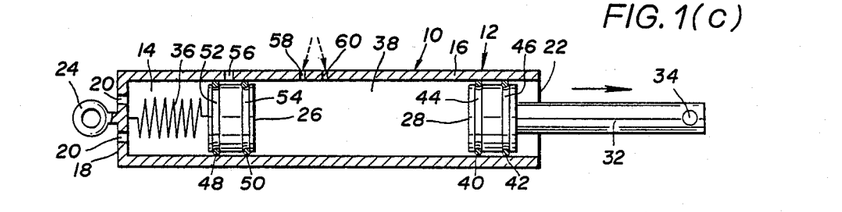
FIG. 1(c) is a similar view to FIG. 1(b) showing the position of parts during a transient period when the shock absorber is extending under the influence of a light load

If the glove box is opened under the influence of a light load, the actuator piston 28 moves from the position illustrated in FIG. 1(b) to the right. This rightward movement of the actuator piston 28 causes the piston head 30 to expand the volume of the adjustment chamber 38, creating a vacuum therein. Since this vacuum is not high enough to cause a rightward movement of the adjustment piston 26 against the return sping 36, the adjustment piston 26 stays in the predetermined position and thus air is allowed to flow into the adjustment chamber 38 via the two holes 58, 60 at a predetermined flow rate during this rightward movement as shown in FIG. 1(c). This causes a deceleration of the actuator piston 28, thus allowing it to move at a slow speed. As a result, a slow and gradual opening movement of the glove box is accomplished.

If the glove box is under the influence of a heavy load, the actuator piston 28 moves from the position illustrated in FIG. 1(b) to the right initially at a high speed, causing a rapid expansion in the volume of the adjustment chamber 38, thus creating a high vacuum therein. This high vacuum causes the adjustment piston 26 to move against the bias of the return spring 36 to the position illustrated in FIG. 1(d) where the hole 58 is situated between the two O-rings 48, 50 of the adjustment piston so that this hole 58 is prevented from opening to the adjustment chamber 26, too. Thus, air is allowed to flow into the adjustment chamber 38 via the hole 60 only. This causes a large deceleration of the actuator piston 28, causing a rightward movement of the actuator piston 28. As a result, a slow and gradual opening movement of the glove box is accomplished as even under the influence of such heavy load.

The return spring 36 is chosen such that the adjustment piston 26 moves to the position where the force of the return spring 36 balances with the vacuum created in the adjustment chamber 38 during the rightward movement of the actuator piston 28 under the influence of the heavy load.

After the glove box has assumed its fully opened position where the actuator piston 28 assumes the rightmost position as illustrated in FIG. 1(c), air flows into the adjustment chamber 38 to cause a reduction in vacuum created within the adjustment chamber. After the vacuum decreases, the adjustment piston 26 returns to the predetermined position illustrated in FIG. 1(b) under the action of the return spring 36.

If the glove box is closed from its fully opened position, the actuator piston 28 is moved from the rightmost position thereof to the left. If a slow closing movement of the glove box is desired, the actuator piston 28 is allowed to move to the left at such a slow speed with a small manual effort because although a positive pressure develops within the adjustment chamber 38, air escapes into the ambient atmosphere via the holes 58, 60 as illustrated in FIG. 1(e) at such a rate as to prevent excessive increase in pressure within the adjustment chamber 38.

If a rapid closing movement of the glove box is desired, the actuator piston 28 is caused to move at a high speed. The leftward movement of the actuator piston 28 at a high speed causes a rapid increase in pressure within the adjustment chamber 38. This rapid increase in pressure within the adjustment chamber 38 causes a leftward movement of the adjustment piston 26 against the force of the return spring 36, pushing the adjustment piston 26 to the left beyond the predetermined position as illustrated in FIG. 1(e) to a position illustrated in FIG. 1(f) where the hole 56 having the largest opening area is also allowed to open to the adjustment chamber 38. Since air can escape at a high flow rate via this hole 56, the rapid leftward movement of the actuator piston 28 is allowed without requiring any substantial manual effort. As a result, the rapid closing movement of the glove box is also allowed.

Referring next to FIGS. 2(a) to 2(e), a second embodiment of a shock absorber 10A according to the present invention is described. The second embodiment is substantially the same as the first embodiment illustrated in FIGS. 1(a) to 1(f) and thus like reference numerals are used to designate like parts in FIGS. 2(a) to 2(e) and FIGS. 1(a) to 1(f).

Figure 2A:
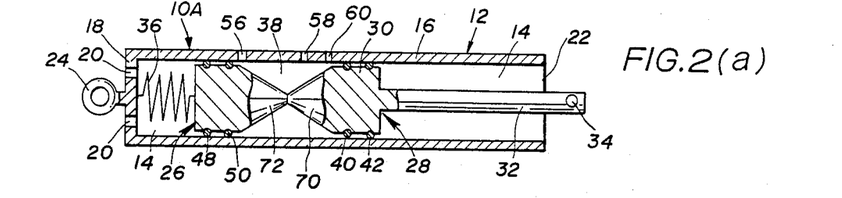
FIGS. 2(a) to 2(e) are sectional views corresponding to FIGS. 1(b) to 1(f), respectively, and show a second embodiment of a shock absorber according to the present invention
Figure 2B:
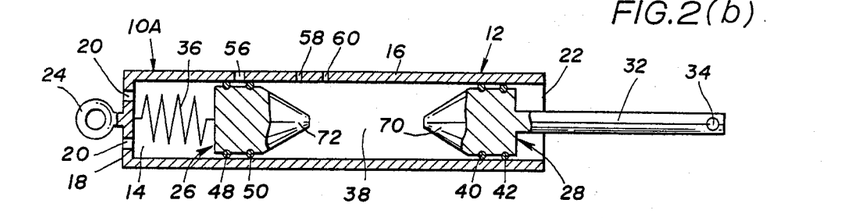
Figure 2C:
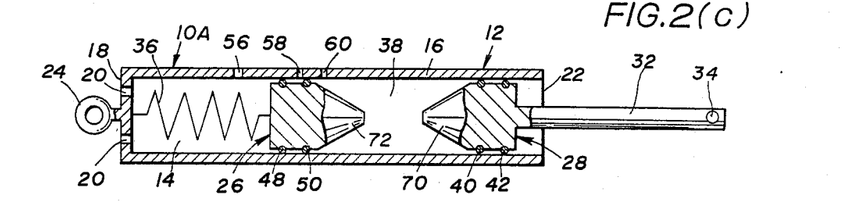
Figure 2D:
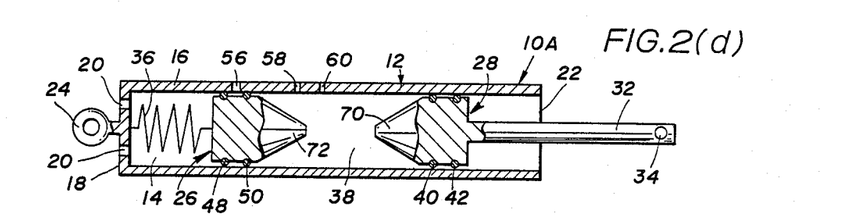
Figure 2E:
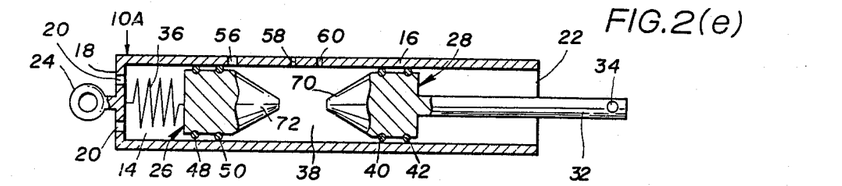

The second embodiment is different from the first embodiment, however, in that a piston head 30 of an actuator piston 28 and an adjustment piston 26 have conical projections 70 and 72, respectively, which extend into an adjustment chamber 38.

Referring to FIG. 2(a) which corresponds to FIG. 1(b) in that it shows the position assumed by the shock absorber 10A when the associated glove box is closed, the conical projection 70 of the piston head 30 is in contact with the conical projection 72 of the adjustment piston 26. In this state, the adjustment piston 26 assumes a position that is displaced toward a closed end wall 18 from a predetermined position illustrated in FIG. 2(b) where an adjustment hole 56 is situated between O-rings 48, 50 of the adjustment piston 26. In this displaced position of the adjustment piston 26, the return spring 36 is preloaded to store energy, thus biasing the adjustment piston 26 and the actuator piston 30 to the right as viewed in FIG. 2(a).

The operation of this shock absorber 10A is described briefly although the operation is substantially the same as that of the first embodiment and will be readily understood from comparison of FIGS. 2(a) to 2(e) with FIGS. 1(b) to 1(f), respectively.

Similarly to the first embodiment, it is assumed that a mounting ring 24 of a cylinder 12 is pivoted to a housing in which a glove box is swingably mounted, and a mounting aperture 34 formed through a rod 32 is used for pivotably mounting the rod 32 to the glove box.

As mentioned before, the shock absorber 10A assumes the position illustrated in FIG. 2(a) when the glove box is closed. In this position, if an external force is applied to the actuator piston 28 in a direction to move the actuator piston 28 to the right as viewed in FIG. 2(a) which is the case when the glove box starts its opening movement. Initially, the adjustment piston 26 follows the rightward movement of the actuator piston 28 under the action of the return spring 36 until it assumes the predetermined position illustrated in FIG. 2(b). Beyond this position, the conical projection 70 of the piston head 30 is separated from the conical projection 72 of the adjustment piston 26, leaving the adjustment piston 26 in the predetermined position illustrated in FIG. 2(b) if the load applied to the actuator piston 28 is light. If the load is heavy, the adjustment piston 26 is pulled to assume a position illustrated in FIG. 2(c).

The fact that the adjustment piston 26 is subject to the bias of the return spring 36 in the position illustrated in FIG. 2(a) is effective in preventing the piston head 30 of the actuator piston 28 and the adjustment piston 26 from sticking with a peripheral wall 16 defining a cylindrical bore 14 which might take place if the glove box is kept closed for a long time. The sticking of the piston head 30 and that of the adjustment piston 26 are mainly caused by adherence of O-rings 40, 42, 48 and 50 to the peripheral wall 16. Thus, the shock absorber 10A is free from inoperative state.

The provision of the O-rings 40, 42, 48 and 50 are effective in sealably defining the adjustment chamber 38, thereby to make fine adjustment of the flow rate of air into or out of the adjustment chamber 38. This assures a desired slow and gradual movement of the actuator piston 28 relative to the cylinder 12 when the shock absorber extends. These O-rings may be eliminated, if desired.

As mentioned previously, a single elongate adjustment hole may be used in the place of a plurality of adjustment holes 56, 58 and 60 arranged in the longitudinal direction of the cylinder 12. However, the desired extending movement of the actuator piston 28 relative to the cylinder 12 is accomplished without any difficulty if the plurality of adjustment holes are used rather than the single elongate adjustment hole.

Referring to FIGS. 3(a) to 3(f), a third embodiment of a shock absorber is described. The shock absorber generally designated by the reference numeral 10B is substantially the same as the shock absorber 10 shown in FIGS. 1(a) to 1(f) except the structure of an adjustment piston that allows a rod of an actuator piston to extend therethrough, thereby to allow disposition of the adjustment piston within an area of a cylindrical bore where the rod of the actuator piston extends.

Figure 3A:
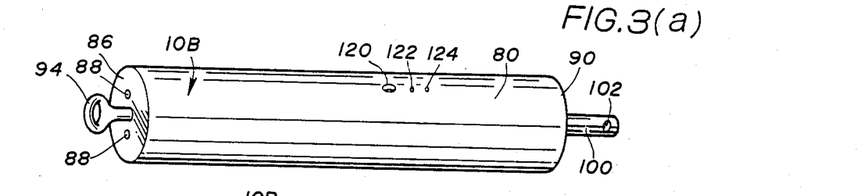
FIGS. 3(a) to 3(f) are sectional views corresponding to FIGS. 1(a) to 1(f), respectively, and show a third embodiment of a shock absorber according to the present invention
Figure 3B:
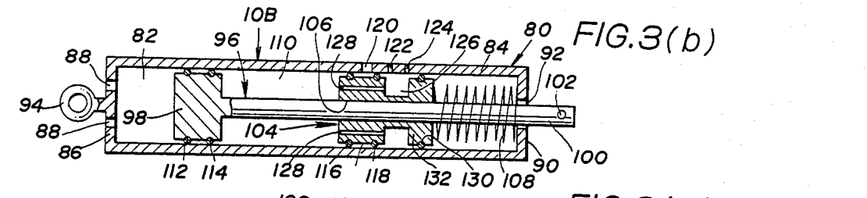

Describing in detail referring to FIGS. 3(a) and 3(b), the shock absorber 10B comprises a cylinder 80 having a cylindrical bore 82 and a peripheral wall 84 defining the cylindrical bore 82. The cylinder 80 has an apertured end wall 86, formed with a plurality of air holes 88, closing one end of the cylindrical bore 82. The opposite end of the bore 82 is also closed by an end wall 90 formed with a center hole 92 serving as an air hole. The apertured end wall 86 is formed with a mounting ring 94.

The actuator piston 96 is slidably received in the bore 82, and it has a piston head 98 and a rod 100 having one end fixedly attached to the piston head 98 and an opposite end formed with a mounting aperture 102. As different from their counterparts of the shock absorber 10 shown in FIG. 1(b), the piston head 98 is disposed near the apertured end wall 86 and thus inserted deeply into the cylindrical bore 82. The rod 100 extends through the center hole 92 of the end wall 90 out of the cylinder 80. The adjustment piston 104 is slidably disposed in that area of the bore 82 where the rod 100 extends and is formed with an axial bore 106 through which the rod 100 extends.

For resiliently keeping the adjustment piston 104 in a predetermined position illustrated in FIG. 3(b), a return spring 108 has one end engaging the end wall 90 and an opposite end engaging the adjustment piston 104. The adjustment piston 104 cooperates with the piston head 98 of the actuator piston 96 to define an adjustment chamber 110 therebetween.

For sealably defining the adjustment chamber 110, two O-rings 112, 114 are mounted on the piston head 98, and two O-rings 116, 118 mounted on the adjustment piston 104.

For defining an air flow passage between the adjustment chamber 110 and the ambient atmosphere so as to allow air flow therebetween, a plurality, three in this embodiment, of adjustment holes 120, 122, and 124 are formed through the peripheral wall 84, the adjustment piston 104 is formed with a circumferential groove 126 serving as a radial passage and axial passages 128 having one end opening to the adjustment chamber 110 and opposite ends opening to the circumferential groove 126. A third O-ring 130 is mounted on a land 132 of the adjustmnt piston 104 so as to prevent air leak from the circumferential groove 126 in cooperation with the O-ring 118. Among all, the hole 120 has the largest opening area, while the other holes 122 and 124 are small in opening area. These adjustment holes 120, 122 and 124 are arranged in a longitudinal direction of the cylinder 80 from the left to the right as viewed in FIG. 3(a). In a predetermined position of the adjustment piston 104 illustrated in FIG. 3(b), the adjustment hole 120 is situated between the two O-rings 116 and 118, while the circumferential groove 126 is open to the other two adjustment holes 122 and 124 so that the adjustment chamber 110 is allowed to communicate with the ambient atmosphere via the axial passages 128, the circumferential groove 126 and two adjustment holes 122 and 124. As will be readily understood from FIGS. 3(b) to 3(f), the adjustment piston 104 is movable from a position illustrated in FIG. 3(b) to a position illustrated in FIG. 3(d) where the adjustment hole 122 is also situated between the O-rings 116 and 118, causing a reduction in the total flow rate of air escaping the adjustment chamber 110. The adjustment piston 104 is movable from the position illustrated in FIG. 3(b) to a position illustrated in FIG. 3(f) where the circumferential groove 126 is open not only to the adjustment hole 122 but also to the adjustment hole 120 that has the largest opening area, causing an increase in the total flow rate of air entering the adjustment chamber 110. The return spring 108 is chosen such that when the adjustment piston 104 stays in the predetermined position illustrated in FIG. 3(b), the adjustment hole 120 having the largest opening area is situated between the two O-rings 116 and 118.

It is now assumed that the shock absorber 10B is used for a glove box for an automotive vehicle such that the mounting ring 94 of the cylinder 80 is pivoted to a housing in which the glove box is swingably mounted and the rod 100 of the actuator piston 96 is pivotably mounted to the glove box via the mounting aperture 102 formed through the rod 100.

Figure 3C:
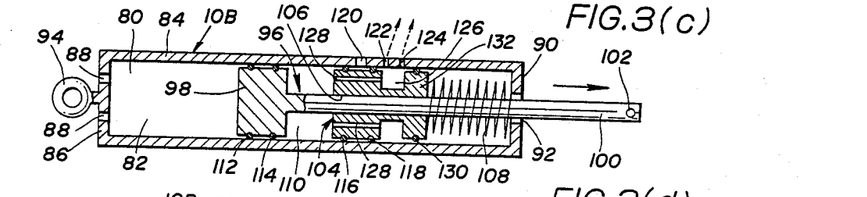
Figure 3D:
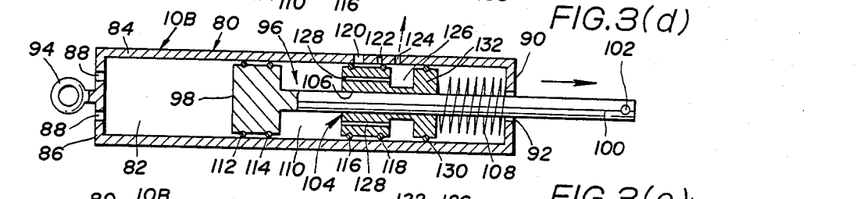

If the glove box is opened under the influence of a light load, the actuator piston 96 is moved from the position illustrated in FIG. 3(b) to the right. This rightward movement of the actuator piston 96 causes the piston head 98 to contract the volume of the adjustment chamber 110, causing an increase in pressure therein. Air displaced from the adjustment chamber 110 is allowed to escape via the axial passages 128, the circumferential groove 126 and the two adjustment holes 122 and 124 at a predetermined flow rate, causing a deceleration of the actuator piston 96 as shown in FIG. 3(c). This results in a slow and gradual opening movement of the glove box.

If the glove box is opened under the influence of a heavy load, the actuator piston 96 moves to the right rapidly initially to cause the piston head 98 to decrease the volume of the adjustment chamber 110 rapidly, causing a rapid increase in pressure within the adjustment chamber 110. This increase in pressure within the adjustment chamber 110 causes the adjustment piston 104 to move against the bias of the return spring 108 to the position illustrated in FIG. 3(d) where both the adjustment hole 120 and adjustment hole 122 are situated between the O-ring 116, 118. Thus, air displaced from the adjustment chamber 110 is allowed to escape from the adjustment chamber 110 through the adjustment hole 124, only. This causes a great deceleration of the actuator piston 96, causing a slow and gradual rightward movement of the actuator piston 96. This results in a slow and a gradual opening movement of the glove box even with such heavy load.

Figure 1D:
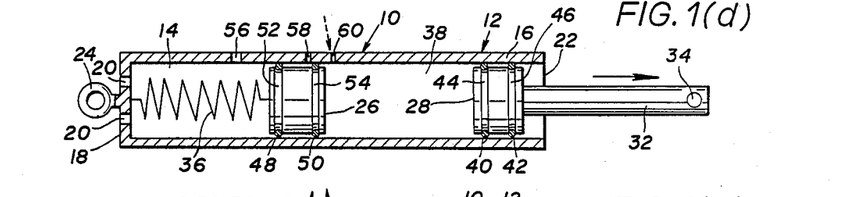
FIG. 1(d) is a similar view to FIG. 1(c) showing the position of parts during a transient period when the shock absorber is extending under the influence of a heavy load
Figure 1E:
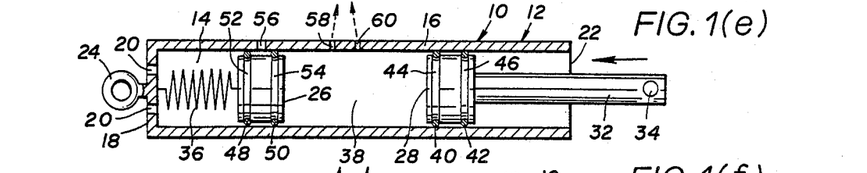
FIG. 1(e) is a similar view to FIG. 1(b) showing the position of parts during a transient period when the shock absorber is contracting at a slow speed
Figure 1F:
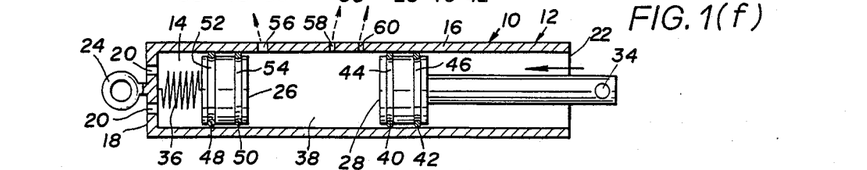
FIG. 1(f) is a similar view to FIG. 1(b) showing the position of parts during a transient period when the shock absorber is contracting at a rapid speed

After the glove box has assumed its fully opened position where the actuator piston 96 assumes the rightmost position illustrated in FIG. 1(d), air escapes the adjustment chamber 110 until the pressure within the adjustment chamber 110 decrease to the atmospheric pressure, allowing the adjustment piston 104 to resume the position illustrated in FIG. 3(c) under the action of the return spring 108.

Figure 3E:
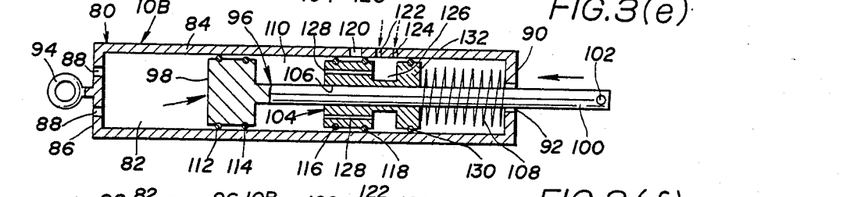
Figure 3F:
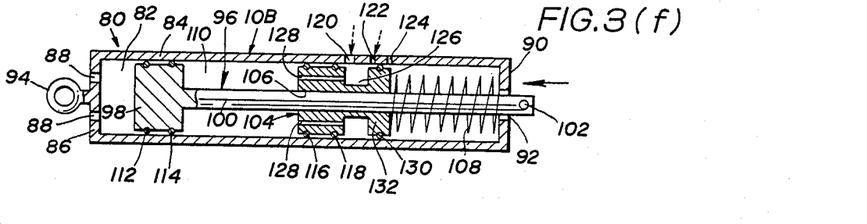

If the glove box is closed from its fully opened position, the actuator piston 96 is moved from the rightmost position thereof to the left as viewed in FIGS. 3(e) or 3(f). If the glove box is desired to be closed at a slow and gradual speed the actuator piston 96 ia allowed to move to the left at such a slow and gradual speed because although a vacuum develops owing to the expansion of the adjustment chamber 110, ambient air can enter the adjustment chamber 110 via the adjustment holes 122 and 124 at a rate great enough to prevent excessive increase in the vacuum. This allows a slow and gradual movement of the glove box with a small manupulating effort.

If the glove box is desired to be closed at a rapid rate, the actuator piston 96 is allowed to move to the left at a high speed. The leftward movement of the actuator piston 96 causes a high vacuum to develop within the adjustment chamber 110. This high vacuum causes the leftward movement of the adjustment piston 104 to move against the force of the return spring 108 to the position illustrated in FIG. 3(f) where the adjustment hole 120 having the largest opening area is allowed to communicate with the adjustment chamber 110. Since air is now allowed to enter the adjustment chamber 110 at a sufficiently high rate, the rapid leftward movement of the actuator piston 28 is allowed. Since the force resisting this leftward movement is not so great, the rapid closing movement of the glove box is effected with a small manipulating effort.

Referring next to FIGS. 4(a) to 4(e), a fourth embodiment of a shock absorber, now designated by the reference numeral 10C, according to the present invention is described. This fourth embodiment is substantially the same as the third embodiment illustrated in FIGS. 3(a) to 3(f) and thus like reference numerals are used to designate like parts in FIGS. 4(a) to 4(e) and FIGS. 3(a) to 3(f).

Figure 4A:
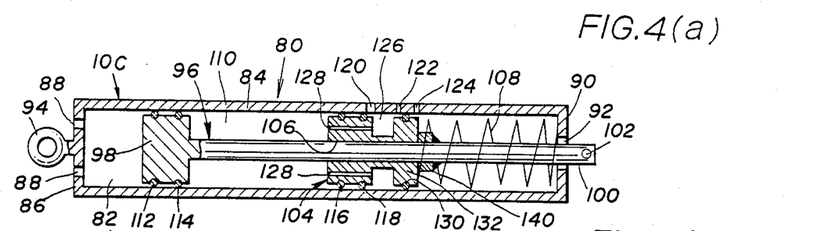
FIGS. 4(a) to 4(e) are sectional views corresponding to FIGS. 3(b) to 3(e), respectively, and show a fourth embodiment of a shock absorber according to the present invention
Figure 4B:
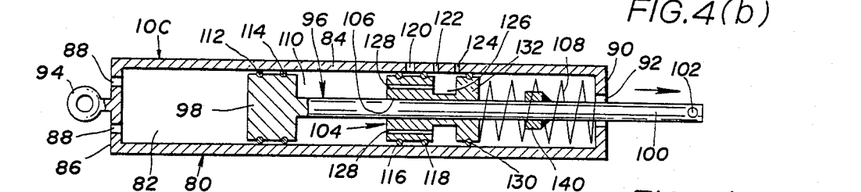
Figure 4C:
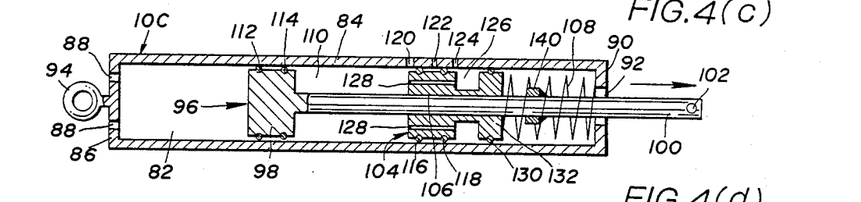
Figure 4D:
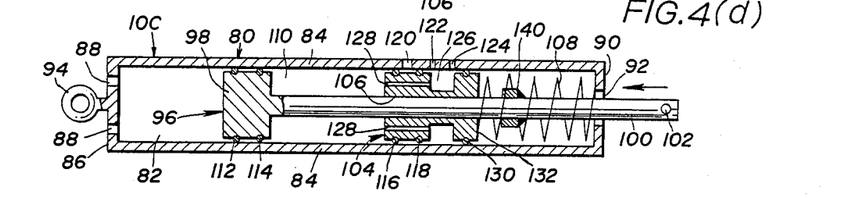
Figure 4E:
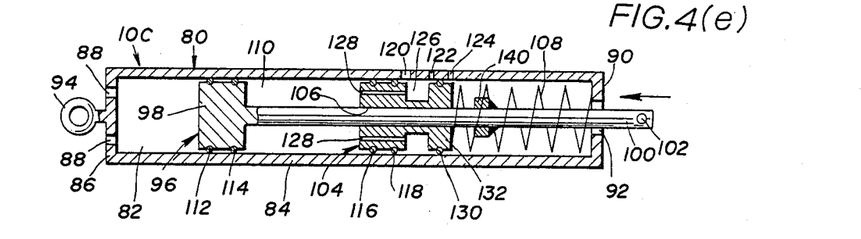

This fourth embodiment is different from the third embodiment, however, in that an abutment 140 is fixedly attached, such as by welding, to a rod 100 of an actuator piston 96 and at a position between an adjustment piston 104 and an end wall 90 formed with a center hole 92 through which the rod 100 extends.

Referring to FIG. 4(a) which corresponds to FIG. 3(b) in that it shows the position assumed by the shock absorber 10C when the associated glove box is closed, the abutment 140 is in contact with the adjustment piston 104. In this state, the adjustment piston 104 assumes a position displaced to the left from a predetermined position illustrated in FIG. 4(b). In this position of the adjustment piston 104, a return spring 108 is preloaded to store energy, thus biasing the adjustment piston 104 and thus the actuator piston 96 to the right.

The operation of this fourth embopdiment is substantially the same as that of the third embodiment and thus will be readily understood from comparison of FIGS. 4(a) to 4(e) with FIGS. 3(b) to 3(f), respectively.

Similarly to the third embodiment, it is now assumed that a mounting ring 94 of a cylinder 80 is pivoted to a housing in which a glove box is swingably mounted, and a mounting aperture 102 formed through the rod 100 is used to pivotably mounting the rod 100 to the glove box.

As mentioned before, the shock absorber 10C assumes the leftwardly displaced position illustrated in FIG. 4(a) when the glove box is closed. Thus, the bias force of the return spring 108 that has been preloaded is exerted on the adjustment piston 104 and the actuator piston 96 in a direction to move the rod 100 to the right.

If the glove box is opened, an external force is applied to the actuator piston 96 tending to move it to the right as viewed in FIG. 4(a). Initially, the adjustment piston 104 follows the movement of the abutment 140 until it assumes the predetermined position illustrated in FIG. 4(b). Beyond this point, the rightward movement of the actuator piston 96 causes the abutment 140 to disengage from the adjustment piston 104, leaving the adjustment piston 104 in the predetermined position illustrated in FIG. 4(b) if a light load is applied to the glove box. The adjustment piston 104 is caused to move to the right to the position illustrated in FIG. 4(c) if the glove box is subject to a heavy load.

The fact that the adjustment piston 104 and the actuator piston 96 are subject to the bias force of the return spring 108 in the position as illustrated in FIG. 4(a) is effective in preventing the piston head 98 of the actuator piston 96 and the adjustment piston 104 from sticking with the peripheral wall 84 defining the cylindrical bore 82 which might take place if the glove box is kept closed for a long time. The sticking of the piston head 98 and that of the adjustment piston 104 are mainly caused by adherence of the O-rings 112, 114, 116, 118, and 130 to the peripheral wall 84 defining the bore 82. Thus according to this fourth embodiment, the shock absorber 10C is prevented from becomong inoperative.

The provision of the O-rings 112, 114, 116, 118 and 130 are effective in sealably defining the adjustment chamber 110 and the circumferential groove 126, thereby to accomplish fine adjustment of the flow rate of air flowing into and out of the adjustment chamber 110. This assures a desired slow and gradual movement of the actuator piston 96 relative to the cylinder 80 when the shock absorber 10C is to extend. These O-rings may be eliminated, if desired, such as in the case fine adjustment is not required.

A single elongate adjustment hole may be used in the place of a plurality of adjustment holes 120, 122, and 124 arranged in the longitudinal direction of the cylinder 80. However, the desired gradual extending movement of the actuator piston 96 relative to the cylinder 80 is accomplished without any difficulty if these plurality of adjustment holes are used.

What is claimed is:

1. A shock absorber comprising:
   a cylinder having a bore and a peripheral wall about an axis defining said bore,
   an actuator piston including a piston head disposed in said bore and slidably engaging said wall at a point along its axis and a rod extending out of said cylinder,
   an adjustment piston disposed in said bore and slidably engaging said wall at a point along its axis to cooperate with said piston head engagement point to define an adjustment chamber within said cylinder bore between the adjustment piston engagement point and piston head engagement point,
   a plurality of longitudinally disbursed passages through said wall between said bore and the ambient atmosphere, and
   means for resiliently biasing said adjustment piston with said adjustment piston engagement point at a predetermined position along the axis of the cylinder between two of the passages and allowing said adjustment piston to move longitudinally within said bore to vary a rate of fluid flow through said passages in response to forces applied to said actuator piston.

2. A shock absorber as claimed in claim 1 wherein said passages include a first passage most distal from said piston head and larger than all other passages and said predetermined position of the adjustment piston engagement point is between said first passage and an adjacent passage.

3. A shock absorber as claimed in claim 1, wherein said cylinder has an apertured end wall closing one end of said bore, and said biasing means includes a spring having one end engaging said adjustment piston and an opposite end engaging said apertured end wall.

4. A shock absorber as claimed in claim 3, wherein said actuator piston has a position where said piston head provides a postive connection with said adjustment piston and said spring is preloaded to bias said adjustment piston and said actuator piston.

5. A shock absorber as claimed in claim 4, wherein said piston head and said adjustment piston have conical projections which extend into said adjustment chamber and come into contact with each other to provide said positive connection.

6. A shock absorber as claimed in claim 5, wherein said cylinder has an open end at an end of said bore which is opposite to said apertured end wall, said rod extending through said open end.

* * * * *